United States Patent
Mehmanpazir et al.

(10) Patent No.: US 11,625,736 B2
(45) Date of Patent: Apr. 11, 2023

(54) USING MACHINE LEARNING TO TRAIN AND GENERATE AN INSIGHT ENGINE FOR DETERMINING A PREDICTED SALES INSIGHT

(71) Applicant: Oracle International Corporation, Redwood Shores, CA (US)

(72) Inventors: Behnam Mehmanpazir, Portola Valley, CA (US); Jeffrey Michael Mccarthy, Foster City, CA (US); Christina Stavrinou Kite, Foster City, CA (US); Enda Hu, Hillsborough, CA (US)

(73) Assignee: Oracle International Corporation, Redwood Shores, CA (US)

( * ) Notice: Subject to any disclaimer, the term of this patent is extended or adjusted under 35 U.S.C. 154(b) by 199 days.

(21) Appl. No.: 16/700,813

(22) Filed: Dec. 2, 2019

(65) Prior Publication Data

US 2021/0166251 A1 Jun. 3, 2021

(51) Int. Cl.
*G06Q 30/02* (2012.01)
*G06N 20/00* (2019.01)
*G06Q 30/0202* (2023.01)

(52) U.S. Cl.
CPC ......... *G06Q 30/0202* (2013.01); *G06N 20/00* (2019.01)

(58) Field of Classification Search
None
See application file for complete search history.

(56) References Cited

U.S. PATENT DOCUMENTS

| 9,020,868 | B2 | 4/2015 | Elkins et al. |
| 10,621,203 | B2* | 4/2020 | Hunt ..................... G06F 16/283 |
| 10,860,557 | B2* | 12/2020 | Eberl .................... G06F 16/245 |
| 11,100,524 | B1* | 8/2021 | Ross .................. G06Q 30/0205 |
| 2016/0171537 | A1* | 6/2016 | Fanous ................... G06F 16/25 |
| | | | 705/14.53 |
| 2019/0272557 | A1* | 9/2019 | Smith .................... G06N 20/00 |
| 2020/0111100 | A1* | 4/2020 | Adjaoute ........... G06Q 20/4016 |

OTHER PUBLICATIONS

Yoseph et al., Segmenting Retail Customers with an Enhanced RFM and a Hybrid Regression/Clustering Method, Dec. 3-7, 2018, 2018 International Conference on Machine Learning and Data Engineering (iCMLDE), IEEE, Jan. 17, 2019 (Year: 2018).*

Lu et al., Data-Driven Decision-Making (D3M): Framework, Methodology, and Directions,Jun. 6, 2019, IEEE, (Year: 2019).*

(Continued)

*Primary Examiner* — Chesiree A Walton
(74) *Attorney, Agent, or Firm* — Invoke

(57) ABSTRACT

An insight engine that takes into account a wide variety of information from a wide variety of sources for predicting a sales insight is generated. The insight engine is generated using machine learning. Historical customer-specific information, product-specific information, and environmental information are aggregated, based on customer, product, and/or time period, into historical customer profiles. The historical customer profiles are labeled with historical sales insights to form a training set. A machine learning algorithm is applied to the training set to generate an insight engine. The insight engine is applied to a target customer profile to determine a predicted sales insight for a target entity.

19 Claims, 12 Drawing Sheets

(56) References Cited

OTHER PUBLICATIONS

Ongsulee et al., "Big Data, Predictive Analytics and Machine Learning," 2018 16th International Conference on ICT and Knowledge Engineering (ICT&KE), 2018, pp. 1-6 (Year: 2018).*
Yoseph et al., Segmenting Retail Customers with an Enhanced RFM and a Hybrid Regression/Clustering Method, Dec. 3-7, 2018, 2018 International Conference on Machine Learning and Data Engineering (iCMLDE), IEEE, Jan. 17, 2019 (Year: 2019).*
Jason Brownlee, "A Tour of The Most Popular Machine Learning Algorithms", Machine Learning Algorithms, Aug. 12, 2019, 55 pages.
SAS, "Machine Learning", available online at <https://www.sas.com/en_in/insights/analytics/machine-learning.html>, 8 pages.
Wikipedia, "Arlincial neural network", Retrieved from <https://en.wikipedia.org/w/index.php?title=Artificial_neural_network&oldid=919772681>, last edited on Oct. 5, 2019, 22 pages.
Wikipedia, "Decision tree learning", Retrieved from <https://en.wikipedia.org/w/index.php?title=Decision_tree_learning&oldid=918442157>, last edited on Sep. 28, 2019, 9 pages.
Wikipedia, "k-nearest neighbors algorithm", Retrieved from <https://en.wikipedia.org/w/index.php?title=K-nearest_neighbors_algorithm&oldid=917544526>, last edited on Sep. 24, 2019, 9 pages.
Wikipedia, "Regression analysis", Retrieved from <https://en.wikipedia.org/w/index.php?title=Regression_analysis&oldid=917445902>, last edited on Sep. 23, 2019, 11 pages.

* cited by examiner

Customer-Specific
Information Table
402

| Customer Index | Timestamp | Customer Name | Contract Term | Subscribed Products | Product Usage |
|---|---|---|---|---|---|
| 0 | 12/15/2010 | Hanna Bags | 3 | Basic DB | 30 GB Storage |
| 1 | 12/10/2013 | Hanna Bags | 3 | Basic DB | 15 GB Storage |
| 2 | 10/1/2014 | Smith Shoes | 5 | Deluxe DB | 40 GB Storage |
| 3 | 1/4/2019 | Smith Shoes | 6 | Deluxe DB<br><br>HR Management | 50 GB Storage<br>25 MB Transactions |

Product-Specific
Information Table
404

| Product Index | Timestamp | Product Name | Product Functionality | System Performance | Pricing |
|---|---|---|---|---|---|
| 0 | 12/1/2010 | Basic DB | 6 | 6 | 7 |
| 1 | 12/1/2013 | Basic DB | 5 | 6 | 8 |
| 2 | 10/5/2014 | Deluxe DB | 5 | 5 | 5 |
| 3 | 1/15/2019 | Deluxe DB | 9 | 8 | 7 |
| 4 | 1/10/2019 | HR Management | 8 | 7 | 9 |

FIG. 4A

Business Market Information Table 406

| Company Market Index | Timestamp | Company Market Performance |
|---|---|---|
| 0 | 12/1/2010 | 8 |
| 1 | 10/1/2014 | 5 |
| 2 | 1/1/2019 | 7 |

Customer Market Information Table 408

| Customer Market Index | Timestamp | Customer Name | Customer Market Performance |
|---|---|---|---|
| 0 | 12/1/2010 | Hanna Bags | 6 |
| 1 | 10/1/2014 | Smith Shoes | 7 |
| 2 | 1/1/2019 | Smith Shoes | 8 |

Product Market Information Table 410

| Product Market Index | Timestamp | Product Name | Product Market Performance |
|---|---|---|---|
| 0 | 12/5/2010 | Basic DB | 4 |
| 1 | 10/5/2014 | Deluxe DB | 6 |
| 2 | 1/5/2019 | Deluxe DB | 8 |
| 3 | 1/5/2019 | HR Management | 7 |

FIG. 4B

Customer Profile Table 412

| Customer Profile Index | Customer Index | Product Index | Company Market Index | Customer Market Index | Product Market Index |
|---|---|---|---|---|---|
| 0 | 0 | 0 | 0 | 0 | 0 |
| 1 | 1 | 1 | - | - | - |
| 2 | 2 | 2 | 1 | 1 | 1 |
| 3 | 3 | 3, 4 | 2 | 2 | 2, 3 |

FIG. 4C

Action Log 414

| Action Index | Customer Name | Action | Action Date |
|---|---|---|---|
| 0 | Hannah Bags | Renew Contract; Sign On Basic DB | 12/16/2010 |
| 1 | Hannah Bags | Terminate Relationship | 12/15/2013 |
| 2 | Smith Shoes | Begin Onboarding | 5/31/2014 |
| 3 | Smith Shoes | Begin Planning | 7/3/2014 |
| 4 | Smith Shoes | Begin Implementation | 8/28/2014 |
| 5 | Smith Shoes | Begin Provisioning; Sign On Deluxe DB | 9/13/2014 |
| 6 | Smith Shoes | Begin Live | 10/1/2014 |
| 7 | Smith Shoes | Renew Contract; Sign On Deluxe DB and HR Management | 1/3/2019 |

FIG. 4D

Renewal Training Set 416

| Renewal Training Set Index | Customer Profile Index | Renewed? |
|---|---|---|
| 0 | 0 | Yes |
| 1 | 1 | No |
| 2 | 3 | Yes |

Cross-Sell Training Set 418

| Cross-Sell Training Set Index | Customer Profile Index | Subscribed Products |
|---|---|---|
| 0 | 0 | Basic DB |
| 1 | 1 | Basic DB |
| 2 | 2 | Deluxe DB |
| 3 | 3 | Deluxe DB, HR Management |

FIG. 4E

Life Cycle Stage Information Table 420

| Renewal Index | Customer Name | Date Entered Starting Stage | Starting Stage | End Stage | Time Between |
|---|---|---|---|---|---|
| 0 | Smith Shoes | 5/31/2014 | Onboarding | Planning | 33 |
| 1 | Smith Shoes | 7/3/2014 | Planning | Implement-ation | 56 |
| 2 | Smith Shoes | 8/28/2014 | Implement-ation | Provisioning | 16 |
| 3 | Smith Shoes | 9/13/2014 | Provisioning | Live | 18 |

Customer Age Information Table 422

| Age Index | Customer Name | Date Entered Relationship | Date Ended Relationship | Age |
|---|---|---|---|---|
| 0 | Hannah Bags | 12/1/2007 | 12/15/2013 | 2206 |
| 1 | Smith Shoes | 9/13/2014 | N/A | 1844 |

FIG. 4F

Life Cycle
Training Set
424

| Life Cycle Training Set Index | Customer Profile Index | Starting Stage | Ending Stage | Time Between |
|---|---|---|---|---|
| 0 | 2 | Onboarding | Planning | 33 |
| 1 | 2 | Planning | Implementation | 56 |
| 2 | 2 | Implementation | Provisioning | 16 |
| 3 | 2 | Provisioning | Live | 18 |

Customer Age
Training Set
426

| Customer Age Training Set Index | Customer Profile Index | Terminated? | Age |
|---|---|---|---|
| 0 | 0, 1 | Yes | 2206 |
| 1 | 2, 3 | No | 1844 |

FIG. 4G

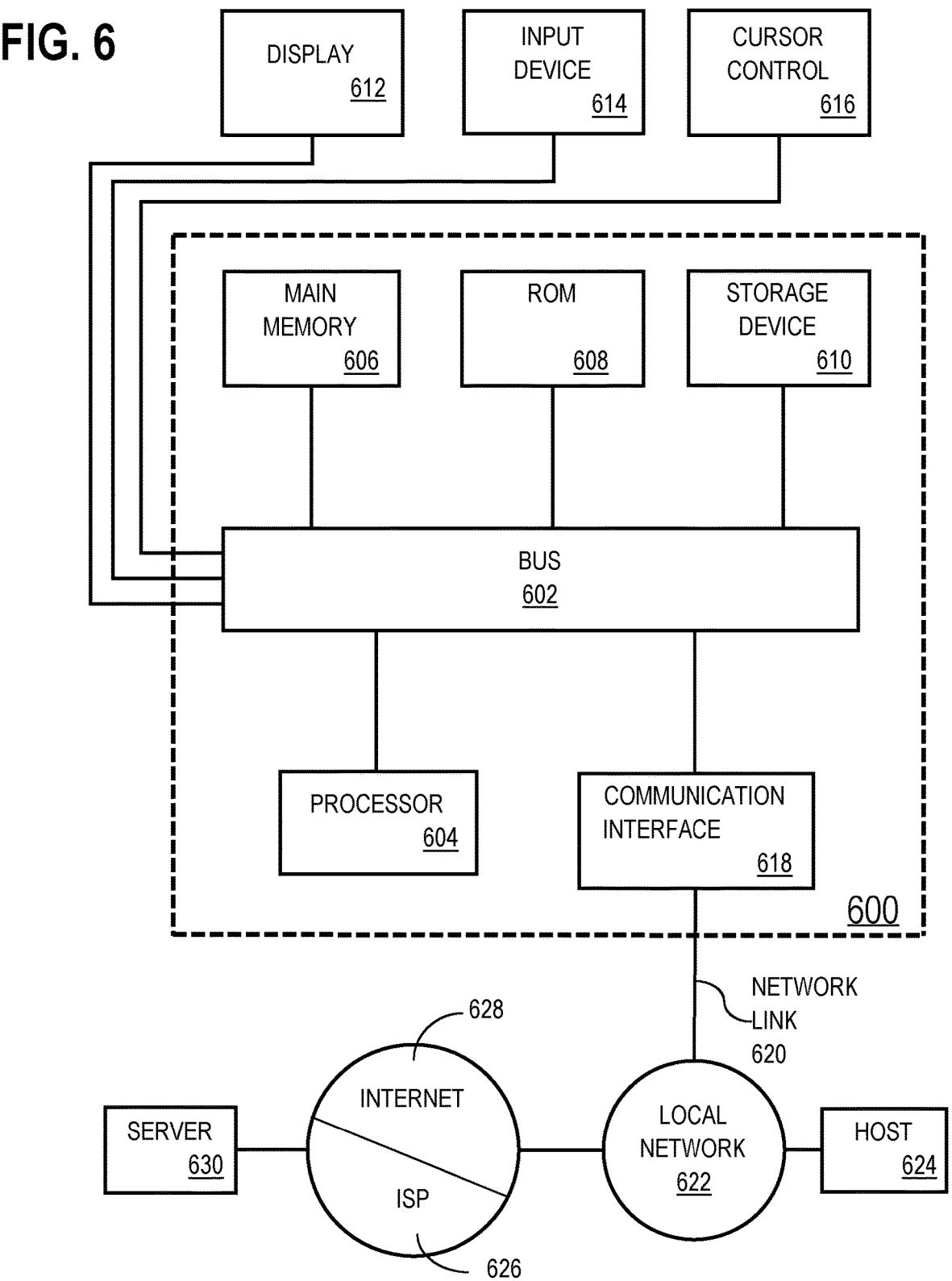

USING MACHINE LEARNING TO TRAIN AND GENERATE AN INSIGHT ENGINE FOR DETERMINING A PREDICTED SALES INSIGHT

TECHNICAL FIELD

The present disclosure relates to machine learning. In particular, the present disclosure relates to using machine learning to train and generate an insight engine for determining a predicted sales insight.

BACKGROUND

Machine learning is a method of data analysis that automates generation of analytical models. A computer system analyzes data, identify patterns, and/or makes inferences, thereby generating and/or updating an analytical model with minimal human intervention. The analytical model is used to make predictions, determine classifications, make decisions, and/or take other actions. Machine learning is a subset of artificial intelligence.

In a marketplace, many factors influence an entity's decision to become and/or remain a customer of a business. Sales departments utilize a variety of sales and marketing applications to keep track of potential, current, and past customers. Using information presented by the sales and marketing applications, sales departments take various actions in an effort to maximize the chances of gaining and/or maintaining a customer. However, the information presented by the sales and marketing applications do not sufficiently take into account the variety of factors influencing an entity's decision to become and/or remain a customer.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIGS. 4A-G illustrate examples for generating a training set for training and generating an insight engine, in accordance with one or more embodiments;

FIG. 6 shows a block diagram that illustrates a computer system in accordance with one or more embodiments.

DETAILED DESCRIPTION

Figure 1:
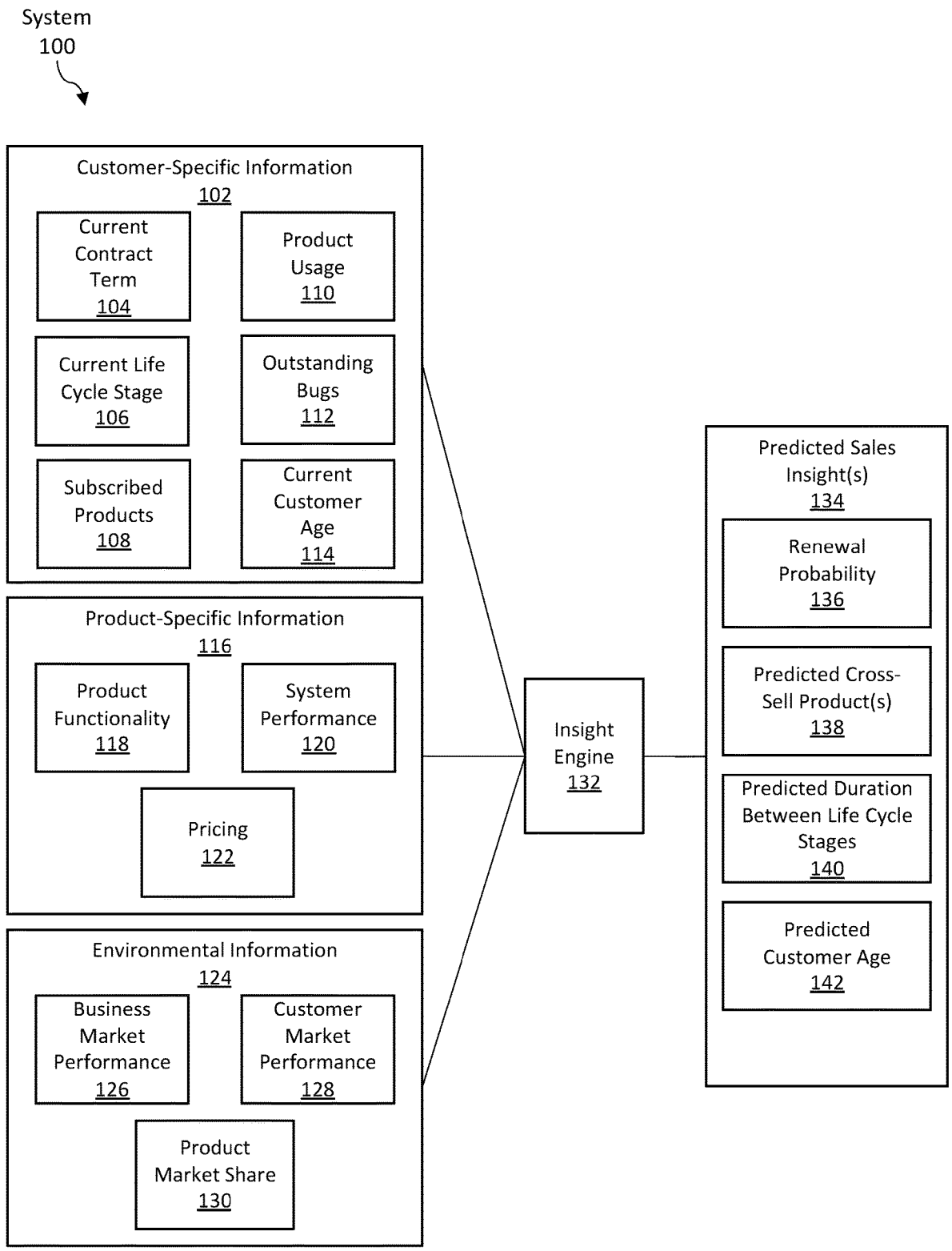
FIG. 1 illustrates an example sales insight system, in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. SALES INSIGHT SYSTEM ARCHITECTURE
3. USING MACHINE LEARNING TO TRAIN AND GENERATE AN INSIGHT ENGINE FOR PREDICTING A SALES INSIGHT
4. EXAMPLE EMBODIMENTS
5. COMPUTER NETWORKS AND CLOUD NETWORKS
6. HARDWARE OVERVIEW
7. MISCELLANEOUS; EXTENSIONS

1. GENERAL OVERVIEW

One or more embodiments include using machine learning to train and generate an insight engine for predicting a sales insight. A sales insight includes any type of information about the behavior of a potential, current, and/or past customer as related to purchasing a product and/or service from a business. Examples of sales insights include whether an entity renews a contract for a product and/or service, a set of one or more cross-sell products and/or services that the entity additionally purchases, a duration of time that passes between life cycle stages, and a customer age (a duration that an entity remains a customer of a business).

A wide variety of historical information from a wide variety of sources are gathered into a training set for training an insight engine via machine learning. The historical information may include historical customer-specific information, historical product-specific information, and historical environmental information. The historical information is aligned based on customer, product, and/or time period to generate historical customer profiles. The historical customer profiles are labeled with historical sales insights to generate the training set. A machine learning algorithm is applied to the training set to generate an insight engine. Examples of machine learning algorithm include regression algorithms, instance-based algorithms, regularization algorithms, decision tree algorithms, Bayesian algorithms, clustering algorithms, association rule learning algorithms, artificial neural network (ANN) algorithms, deep learning algorithms, dimensionality reduction algorithms, and ensemble algorithms. The insight engine is applied to a target customer profile to determine a predicted sales insight for a target entity. Actual sales insights of one or more entities may be fed back into the machine learning system to update the insight engine.

In an embodiment, a product and/or service associated with a target customer or potential customer includes an application executing in a cloud environment. Each application instance and/or application server in the cloud environment may emit metrics. Examples of metrics include user logins, transactions performed, and compute performance units (such as Oracle Compute Unit (OCPU), and virtual central processing unit (vCPU)). A central repository collects the metric information. The central repository consolidates the metric information under common customer identifiers. Such information may be used to form a target customer profile. Additionally or alternatively, such information may be used to form a training set for training an insight engine.

Sales and marketing applications that include an insight engine trained based on the wide variety of information as described above are able to produce richer predicted sales insights for an entity. The predicted sales insights may guide further interactions with the entity. As an example, if a predicted sales insight indicates that a probability of contract renewal is below a threshold value of 50%, then the sales and marketing application may cause a promotion to be transmitted to the entity. As another example, if a predicted sales insight predicts that an entity will subscribe to an additional product, then the sales and marketing application may determine an increased revenue and/or increased sales commission based on subscription to the additional product.

One or more embodiments described in this Specification and/or recited in the claims may not be included in this General Overview section.

2. SALES INSIGHT SYSTEM ARCHITECTURE

FIG. 1 illustrates an example sales insight system, in accordance with one or more embodiments. As illustrated in FIG. 1, a system 100 includes customer-specific information 102, product-specific information 116, environmental information 124, an insight engine 132, and one or more predicted sales insights 134. In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

In one or more embodiments, customer-specific information 102 includes information that is specific to each entity that is a potential, current, and/or past customer of a business.

Customer-specific information 102 may include a current contract term 104 associated with an entity. The system 100 may obtain the current contract term 104 from a customer relationship management (CRM) application and/or other application. A CRM application is an application designed to manage customer information, including potential sales, past sales, and contact information. As an example, an entity may be signed onto a contract with a business. A CRM application may store details of the contract, including (a) an obligation to subscribe to Wonder Cloud Service for one year at $1,000 per month, and (b) an option to renew at the same price for an additional half a year. Current contract term information obtained from the CRM application may include the one-year required term and/or the half-year optional term.

Customer-specific information 102 may include a current life cycle stage 106 associated with an entity. An example of a sequence of stages in a customer life cycle include: Onboarding, planning, implementation, provisioning, and live. Onboarding refers to a time period wherein an entity is identified as a potential customer. A business and the entity may be engaged in talks to see if the entity is interested to purchase. Planning refers to a time period wherein the business and the entity plan what products the entity needs to serve the entity's goals, what is an intended usage of each product, what customizations (such as specific fields in a database, functions, features) are needed by the entity. Implementation refers to a time period wherein the entity prepares to implement the planned products, which may include incorporating the planned products into the entity's current computing environment and/or workflow. Provisioning refers to a time period wherein the entity and the business finalize and execute contractual terms. Live refers to a time period wherein the entity is able to actively login to and/or use the purchased products. The life cycle stage 106 may be obtained from a CRM application and/or other application.

Customer-specific information 102 may include a set of subscribed products 108 associated with an entity. An entity may subscribe to one or more products and/or services offered by a business. The system 100 may obtain the set of subscribed products 108 from a CRM application and/or other application.

Customer-specific information 102 may include product usage 110 of a subscribed product associated with the entity. Product usage 110 may include any type of information representing a level of usage of a particular product and/or service, such as a duration of time used, an amount of memory stored, an amount of data transmitted, a number of operations executed, and/or a central processing unit (CPU) usage. Product usage 110 may include information indicating a customer's actual usage of a product and/or service in comparison to the customer's subscribed level of usage. Product usage 110 may include, for example, a percentage at which actual usage is above or below subscribed usage.

The system 100 may obtain product usage 110 information from a monitoring service that monitors usage of products and/or services offered by a business. Additionally or alternatively, the system 100 may obtain product usage 110 information from a log generated by products and/or services offered by a business. Product usage 110 may be obtained from other applications and/or sources as well.

In an embodiment, a product and/or service associated with a target customer or potential customer includes an application executing in a cloud environment. Product usage 110 may be derived from metrics collected from each application instance and/or application server in the cloud environment.

Each application instance and/or application server in the cloud environment may emit metrics associated with the application instance. An agent may be installed on each instance and/or server to emit such information. Examples of metrics include user logins, transactions performed, and compute performance units. Examples of compute performance units include Oracle Compute Unit (OCPU), and virtual central processing unit (vCPU)). OCPU is the CPU capacity equivalent of one physical core of an Intel Xeon processor with hyper threading enabled. Each OCPU corresponds to two hardware execution threads, known as vCPUs.

A central repository collects the metric information. The central repository consolidates the metric information under common customer identifiers. Analytics are performed on the metric information of a particular customer in order to obtain product usage 110.

An agent installed on an application instance and/or application server may perform pre-processing on metric data to obtain product usage 110 information prior to transmitting the information to the central repository. Additionally or alternatively, the agent may transmit the raw metric data to the central repository, which then performs the analytics.

Further details regarding cloud environments are described below with reference to Section 5, entitled "Computer Networks and Cloud Networks."

Customer-specific information 102 may include outstanding bugs 112 of a subscribed product that are raised by an entity. When an entity uses a product and/or service, the entity may encounter a bug and report the bug to the business. The business may have a workflow for processing the reported bug. For example, the bug may be entered into a bug report application and/or a customer service application. A software developer may work on debugging the issue. A customer service representative may provide status updates regarding resolution of the bug to the entity. Finally, the bug may be resolved. While the bug is not yet resolved, the bug may be referred to as an "outstanding bug." The system 100 may obtain outstanding bugs 112 information from a bug report application, a customer service application, and/or other application.

Customer-specific information 102 may include a current customer age 114 of an entity. Customer age refers to a duration that an entity remains a customer of a business. If an entity is not yet a customer of a business, then the customer age is zero. If an entity is currently a customer of a business, then the customer age is the time passed since the entity became a customer. If an entity was but no longer is a customer of a business, then the customer age is the duration between the time the entity became a customer and the time the entity stopped being a customer. Customer age may be inferred based on one or more contracts executed by an entity. As an example, an entity may execute a first contract to sign up for a service, and then execute a second contract to renew the service. The first contract may indicate a service term from Jan. 1, 2010 to Dec. 31, 2013. The second contract may indicate a service term from Jan. 1, 2014 to Dec. 31, 2020. If the current date is Oct. 1, 2019, then it may be inferred that the entity remains a customer. A customer age may be a duration between Jan. 1, 2010 and Oct. 1, 2019, which is 3560 days. The system 100 may obtain contract information from a CRM application and/or other application. Additionally or alternatively, customer age may be inferred based on payment history. As an example, an entity may make monthly payments of $1,000 per month from Jan. 1, 2010 to Dec. 31, 2014. The entity may stop all payments after Dec. 31, 2014. It may be inferred the entity is no longer a customer. A customer age may be a duration between Jan. 1, 2010 and Dec. 31, 2014, which is 1825 days. The system 100 may obtain payment information from a payment application and/or other application. Customer age 114 may be obtained from other applications and/or sources as well.

In one or more embodiments, product-specific information 116 includes information that is specific to an individual product and/or service offered by a business.

Product-specific information 116 may include product functionality 118 information. Product functionality 118 refers to a score representing a product functionality of a product and/or service, relative to similar products and/or services offered by the business itself and/or other businesses in the same market. As an example, a set of similar products offered by different businesses may be identified. Functionality and/or features of the products may be identified. The products may be scored based on the functionality available. Greater weight may be given to more critical features. As another example, a third-party product review service may provide ratings for a set of similar products offered by different businesses. The ratings may be provided in numerical and/or descriptive form. Natural language processing may be applied to descriptive ratings to determine a score. The system 100 may obtain product functionality 118 information from a product rating application, a third-party product review service, and/or other application.

Product-specific information 116 may include system performance 120 information. System performance 120 refers to a score representing a system performance of a product and/or service, relative to similar products and/or services offered by the business itself and/or other businesses in the same market. As an example, a benchmark test may be executed on similar products offered by different businesses. Performance levels achieved while executing the benchmark test may be recorded. Recorded performance levels may include an amount of memory used, CPU usage, a speed associated with executing the benchmark test, and/or other performance factors. The results from the benchmark test may be normalized to determine a score for each product. The system 100 may obtain system performance 120 information from a testing application and/or other application.

Product-specific information 116 may include pricing 122 information. Pricing 122 refers to a score representing a pricing of a product and/or service, relative to similar products and/or services offered by the business itself and/or other businesses in the same market. As an example, a set of similar products offered by different businesses may be identified. Prices of the products may be identified. The products may be scored based on the pricing. The system 100 may obtain pricing 122 information by scrapping websites of various businesses that offer the products. The system 100 may obtain pricing 122 information by conducting a survey of the potential, current, and/or past customers of the business and/or the business's competitors. The system 100 may obtain pricing 122 information from other applications and/or sources as well.

In one or more embodiments, environmental information 124 includes information associated with an environment in which a product and/or service is offered by a business to an entity.

Environmental information 124 may include a business market performance 126. Business market performance 126 refers to a score representing a market performance of a business offering a product and/or service to an entity, relative to other businesses in the same market. Business market performance 126 may be determined based on stock pricing, press releases, quarterly reportings, third-party reviews, and/or other data sources. The system 100 may obtain stock pricing information from the stock market. The system 100 may obtain press releases from the websites of various businesses. The system 100 may obtain quarterly reportings from the U.S. Securities and Exchange Commission (SEC) and/or other reporting organization. The system 100 may obtain reviews from third parties. Business market performance 126 may be obtained from other applications and/or sources as well.

Environmental information 124 may include a customer market performance 128. Customer market performance 128 refers to a score representing a market performance of an entity that is a potential, current, and/or past customer of a business, relative to other entities in the same market. As an example, an entity may be in the gas and oil industry. The entity's customer market performance would be determined relative to other entities in the gas and oil industry. Customer market performance 128 may be determined in any of the methods used for determining business market performance 126, as described above. The system 100 may obtain customer market performance 128 from any of the sources for determining business market performance 126, as described above.

Environmental information 124 may include a product market share 130. Product market share 130 refers to a score representing a market share of a product and/or service, relative to other similar products and/or services available on the market. The system 100 may obtain product market share 130 from a third-party review service, revenue information published by various businesses offering the products and/or services, customer reviews and/or feedback. Product market share 130 may be obtained from other applications and/or sources as well.

In one or more embodiments, customer-specific information 102, product-specific information 116, and/or environmental information 124 may be stored in one or more data repositories. A data repository is any type of storage unit and/or device (e.g., a file system, database, collection of tables, or any other storage mechanism) for storing data. Further, a data repository may include multiple different storage units and/or devices. The multiple different storage units and/or devices may or may not be of the same type or located at the same physical site. Further, a data repository may be implemented or executed on the same computing system as an insight engine 132. Alternatively or additionally, a data repository may be implemented or executed on a computing system separate from an insight engine 132. The data repository may be communicatively coupled to the insight engine 132 via a direct connection or via a network.

In one or more embodiments, customer-specific information 102, product-specific information 116, and/or environmental information 124 are aggregated to form a customer profile. A customer profile stores information associated with an entity that can be input into an insight engine 132 to determine one or more predicted sales insights 134.

In one or more embodiments, a sales insight includes any type of information about the behavior of a potential, current, and/or past customer as related to purchasing a product and/or service from a business. A predicted sales insight 134 refers to a sales insight that is predicted for an entity. One or more predicted sales insights 134 may be determined by an insight engine 132.

Predicted sales insights 134 may include a renewal probability 136. Renewal probability 136 refers to a probability that an entity will renew a contract for a product and/or service.

Predicted sales insights 134 may include predicted cross-sell products 138. Predicted cross-sell products 138 refers to a set of one or more cross-sell products and/or services that an entity (that is already a customer of a business) is predicted to additionally purchase.

Predicted sales insights 134 may include predicted duration between life cycle stages 140. Predicted duration between life cycle stages 140 refers to a duration of time that is predicted to pass between two life cycle stages. The two life cycle stages may be but are not necessarily consecutive to each other. Life cycle stages are described above with reference to current life cycle stage 106.

Predicted sales insights 134 may include predicted customer age 142. Predicted customer age 142 refers to a duration that an entity is predicted to remain a customer of a business.

In one or more embodiments, an insight engine 132 refers to hardware and/or software configured to perform operations described herein for determining one or more predicted sales insights 134. An insight engine 132 may include a single data model for determining one or more predicted sales insights 134. Alternatively, an insight engine 132 may include multiple data models for determining respective predicted sales insights 134. Examples of operations for determining one or more predicted sales insights 134 are described below with reference to FIG. 3.

In an embodiment, an insight engine 132 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a mainframe, a television, a content receiver, a set-top box, a printer, a mobile handset, a smartphone, and/or a personal digital assistant (PDA).

In an embodiment, an insight engine 132 is associated with a user interface. A user interface refers to hardware and/or software configured to facilitate communications between a user and an insight engine 132. A user interface renders user interface elements to present information to a user and/or receive user input from a user. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms. An insight engine 132 may use a user interface for obtaining customer-specific information 102, product-specific information 116, and/or environmental information 124 from a user.

In an embodiment, an insight engine 132 is associated with an application programming interface (API). An API refers to hardware and/or software configured to facilitate communications between an application and an insight engine 132. An insight engine 132 may use one or more APIs for obtaining customer-specific information 102, product-specific information 116, and/or environmental information 124 from one or more data sources, as described above.

Figure 2:
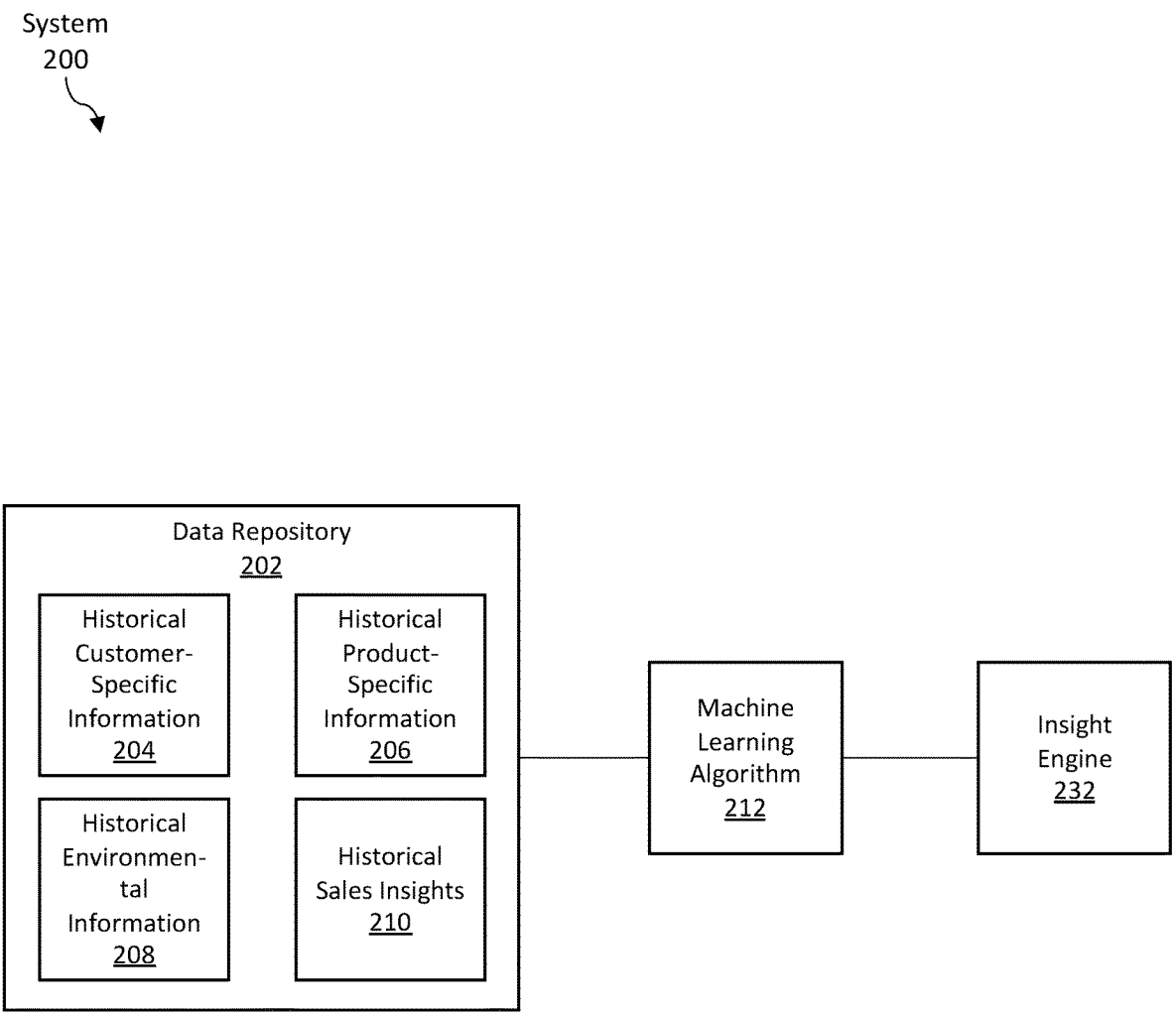
FIG. 2 illustrates an example machine learning system, in accordance with one or more embodiments.

An insight engine 132 is trained, generated, and/or updated using machine learning. FIG. 2 illustrates an example machine learning system, in accordance with one or more embodiments. As illustrated in FIG. 1, a system 200 includes historical customer-specific information 204, historical product-specific information 206, historical environmental information 208, historical sales insights 210, a data repository 202, a machine learning algorithm 212, and an insight engine 232. In one or more embodiments, the system 200 may include more or fewer components than the components illustrated in FIG. 2. The components illustrated in FIG. 2 may be local to or remote from each other. The components illustrated in FIG. 2 may be implemented in software and/or hardware. Each component may be distributed over multiple applications and/or machines. Multiple components may be combined into one application and/or machine. Operations described with respect to one component may instead be performed by another component. System 100 of FIG. 1 and system 200 of FIG. 2 may be considered as two separate systems or a single system.

In one or more embodiments, historical customer-specific information 204 refers to customer-specific information, as described above with reference to customer-specific information 102 of FIG. 1, but with respect to one or more prior time periods. As an example, a current date may be Oct. 1, 2019. Pacific Hospital may have executed a contract with a business in 2010. The contract may specify a term of five years. Products purchased may include Inventory Management Pro, Shipment Easy, and HR Management. Additionally, Comfort Feet Inc. may have executed a contract with the business in 2012. The contract may specify a term of two years. Products purchased may include Inventory Management Pro, and Shipment Easy. Additionally, Comfort Feet Inc. may have executed another contract with the business in 2014. The contract may specify a term of three years. Products purchased may include Inventory Management Pro, Shipment Easy, and Receipt Issuer. A system may obtain historical customer-specific information that includes:

(a) From 2010 to 2015, a contract term of Pacific Hospital was five years.
(b) From 2010 to 2015, subscribed products of Pacific Hospital included Inventory Management Pro, Shipment Easy, and HR Management.
(c) From 2012 to 2014, a contract term of Comfort Feet Inc. was two years.
(d) From 2012 to 2014, subscribed products of Comfort Feet Inc. included Inventory Management Pro, and Shipment Easy.
(e) From 2014 to 2017, a contract term of Comfort Feet Inc. was three years.
(f) From 2014 to 2017, subscribed products of Comfort Feet Inc. included Inventory Management Pro, Shipment Easy, and Receipt Issuer.

Similarly, historical product-specific information 206 refers to product-specific information, as described above with reference to product-specific information 116 of FIG. 1, but with respect to one or more prior time periods. Historical environmental information 208 refers to environmental information, as described above with reference to environmental information 124 of FIG. 1, but with respect to one or more prior time periods.

In one or more embodiments, historical sales insights 210 are sales insights with respect to one or more prior time periods. Historical sales insights 210 may include whether a contract was renewed during a prior time period. Historical sales insights 210 may include a set of one or more products to which an entity was subscribed during a prior time period. Historical sales insights 210 may include a duration of time between life cycle stages that occurred during a prior time period. Historical sales insights 210 may include a customer age, which is a duration of time that an entity remained a customer of a business. The entity may but is not necessarily a current customer.

In one or more embodiments, historical customer-specific information 204, historical product-specific information 206, historical environmental information 208, and historical sales insights 210 are stored in one or more data repositories.

In one or more embodiments, historical customer-specific information 204, historical product-specific information 206, historical environmental information 208, and historical sales insights 210 form a training set for training an insight engine 232. Historical customer-specific information 204, historical product-specific information 206, and historical environmental information 208 are aggregated based on customer, product, and/or time period to form historical customer profiles corresponding to different customers over different time periods. Further, the historical customer profiles are labeled with historical sales insights 210, based on customer, product, and/or time period. The historical customer profiles are labeled with historical sales insights 210 form the training set.

In one or more embodiments, a machine learning algorithm 212 is an algorithm that can be iterated to learn a target model f that best maps a set of input variables to an output variable. In particular, a machine learning algorithm 212 is configured to generate and/or train an insight engine 232. A machine learning algorithm 212 generates an insight engine 232 such that the insight engine 232 best fits the historical customer profiles to the historical sales insights 210. Additionally or alternatively, a machine learning algorithm 212 generates an insight model 232 such that when the insight model 232 is applied to the historical customer profiles, a maximum number of results determined by the insight model 232 matches the historical sales insights 210.

A machine learning algorithm 212 may include supervised components and/or unsupervised components. Various types of algorithms may be used, such as linear regression, logistic regression, linear discriminant analysis, classification and regression trees, naïve Bayes, k-nearest neighbors, learning vector quantization, support vector machine, decision trees, bagging and random forest, boosting, backpropagation. Examples of operations for applying various machine learning algorithms 212 are further described below with reference to FIG. 3.

3. USING MACHINE LEARNING TO TRAIN AND GENERATE AN INSIGHT ENGINE FOR PREDICTING A SALES INSIGHT

Figure 3:
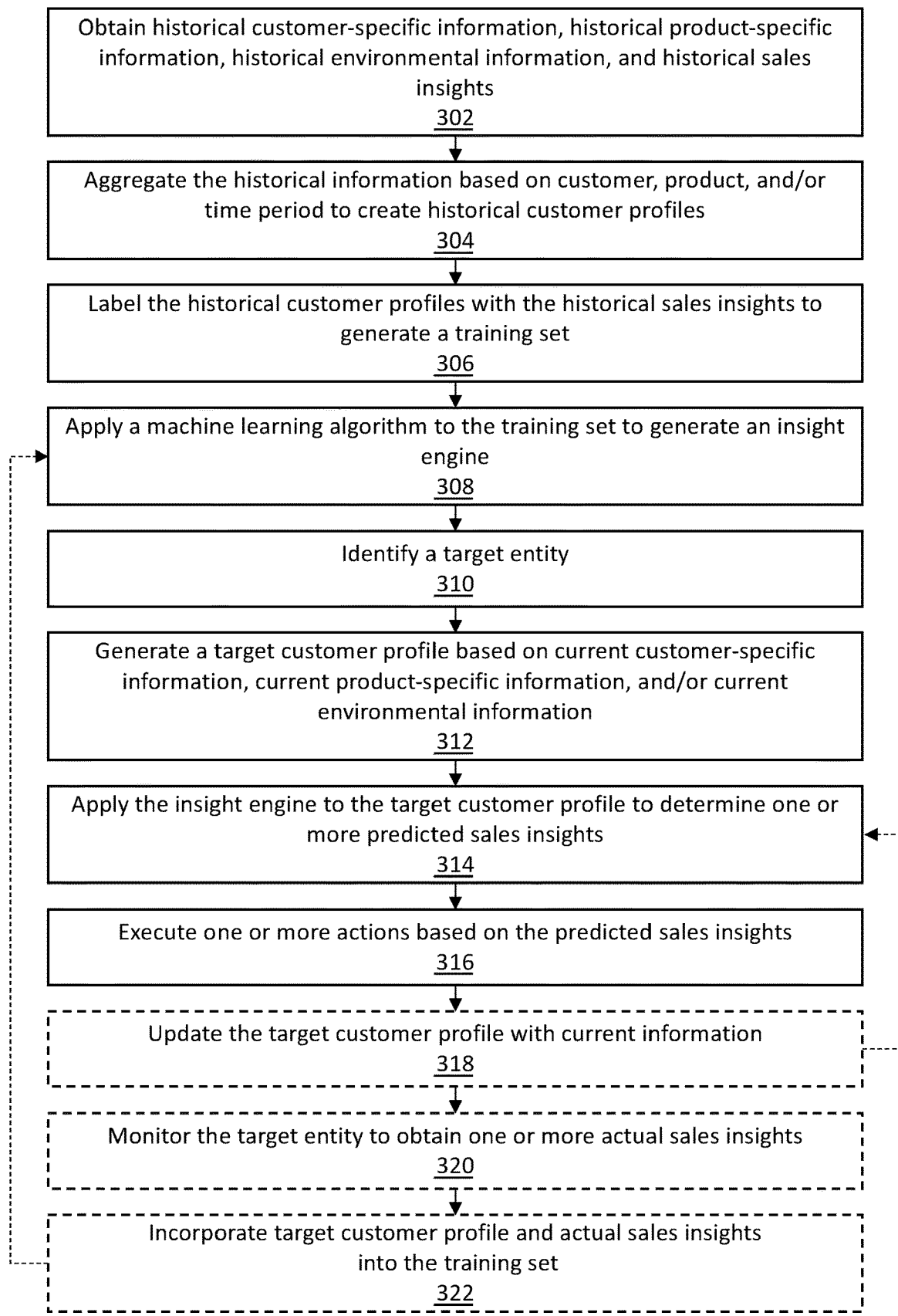
FIG. 3 illustrates an example set of operations for using machine learning to train and generate an insight engine for predicting a sales insight, in accordance with one or more embodiments.

FIG. 3 illustrates an example set of operations for using machine learning to train and generate an insight engine for predicting a sales insight, in accordance with one or more embodiments. One or more operations illustrated in FIG. 3 may be modified, rearranged, or omitted all together. Accordingly, the particular sequence of operations illustrated in FIG. 3 should not be construed as limiting the scope of one or more embodiments.

One or more embodiments include obtaining historical customer-specific information, historical product-specific information, historical environmental information, and historical sales insights (Operation 302). A machine learning system 200 obtains historical customer-specific information, historical product-specific information, historical environmental information, and historical sales insights from one or more data sources.

In an embodiment, the machine learning system 200 gathers historical customer-specific information, historical product-specific information, and/or historical environmental information, from various primary sources. The machine learning system 200 may communicate with various applications through various APIs. The machine learning system may submit queries for historical information to an application through an API. Additionally or alternatively, the application may push historical information to the machine learning system through the API.

As an example, a machine learning system may obtain historical contract terms from a CRM application through an API. The machine learning system may obtain a respective customer and time period corresponding to each historical contract term. The machine learning system may obtain information indicating, for example, that Pacific Hospital was signed onto a contract that had a term of three years from Jan. 1, 2010 to Dec. 31, 2012.

As another example, a machine learning system may obtain historical life cycle stages from a CRM application through an API. The machine learning system may obtain information indicating, for example, that Pacific Hospital was in the onboarding stage from Jun. 15, 2009 to Jul. 12, 2009, and in the planning stage from Jul. 13, 2009 to Aug. 20, 2009.

As another example, a machine learning system may obtain outstanding bugs information from a bug report application through an API. The machine learning system may obtain information indicating, for example, that Pacific Hospital raised a bug in HR Management on Mar. 24, 2010, and the bug was resolved on Apr. 2, 2010. The machine learning system may obtain information indicating, for example, that Foodie Express had an outstanding bug for Inventory Manager from Oct. 3, 2011 to Oct. 5, 2011.

As another example, a machine learning system may obtain product functionality, system performance, and pricing information from one or more product rating applications through one or more APIs. As an example, a machine learning system may obtain information indicating different product functionality scores for a particular product over different time periods.

As another example, a machine learning system may obtain business market performance, customer market performance, and product market share information from one or more market rating applications through one or more APIs. As an example, a machine learning system may obtain information indicating different customer market performance scores for Pacific Hospital over different time periods. The machine learning system may further obtain information indicating different customer market performance scores for Foodie Express over different time periods.

In an embodiment, the machine learning system 200 obtains historical sales insights directly from one or more primary sources. As an example, a CRM application may maintain an action log for an entity. The action log may indicate whether the entity renewed a contract at the end of a previous contract term. A machine learning system may directly obtain renewal information from the action log.

In an embodiment, the machine learning system 200 obtains historical information from one or more primary sources, and determines historical sales insights based on the historical information. As an example, a CRM application may maintain an action log for an entity. The action log may indicate respective dates on which the entity transitioned to respective new life cycle stages. For example, the action log may indicate that an entity began an onboarding stage on Aug. 1, 2015, and a planning stage on Sep. 2, 2015. A machine learning system may determine a difference between the beginning dates of two life cycle stages, as indicated by the action log. The difference between the beginning dates of the two life cycle stages may be determined as a duration of time between the two life cycle stages, which may be used as a historical sales insight.

In an embodiment, the machine learning system 200 retrieves historical customer-specific information, historical product-specific information, historical environmental information, and/or historical sales insights, from one or more databases. The historical information was previously gathered from primary sources, and stored in standardized formats in the databases. The historical customer-specific information, historical product-specific information, and historical environmental information may be stored as historical customer profiles in a database. The historical customer profiles may be stored with labels indicating the corresponding historical sales insights in the database.

One or more embodiments include aggregating the historical information based on the customer, product, and/or time period to create historical customer profiles (Operation 304).

The machine learning system 200 transforms the historical customer-specific information, historical product-specific information, historical environmental information, and/or historical sales insights into a standardized format. The machine learning system 200 aggregates the historical information based on the customer, product, and/or time period to create historical customer profiles.

As an example, a machine learning system identifies customer-specific information that is associated with Pacific Hospital during the time period Jan. 1, 2010 to Feb. 1, 2010. Based on the customer-specific information, the machine learning system identifies products to which Pacific Hospital was subscribed during the time period Jan. 1, 2010 to Feb. 1, 2010. The machine learning system thereafter identifies product-specific information that is associated with each identified product during the time period Jan. 1, 2010 to Feb. 1, 2010. The machine learning system additionally identifies market information for the business during the time period Jan. 1, 2010 to Feb. 1, 2010, and market information for Pacific Hospital during the time period Jan. 1, 2010 to Feb. 1, 2010. The machine learning system additionally identifies market information, corresponding to the time period Jan. 1, 2010 to Feb. 1, 2010, for each product to which Pacific Hospital was subscribed during the time period Jan. 1, 2010 to Feb. 1, 2010. The machine learning system aggregates the above-identified information into a customer profile for Pacific Hospital corresponding to the time period Jan. 1, 2010 to Feb. 1, 2010. The machine learning system may repeat the above process for Pacific Hospital for different time periods to generate customer profiles for Pacific Hospital corresponding to different time periods. Additionally or alternatively, the machine learning system may repeat the above process for different entities that are potential, current, and/or past customers of the business. The machine learning system thereby generates customer profiles for different entities corresponding to different time periods.

As another example, separate tables may store customer-specific information, product-specific information, and environmental information. A machine learning system may identify a particular entry of a customer-specific information table that indicates customer-specific information for a particular entity during a particular time period. The particular entry indicates, among other things, a particular product to which the particular entity was subscribed during the particular time period.

The machine learning system may identify a particular entry of a product-specific information table that indicates product-specific information for the particular product during the particular time period.

The machine learning system may identify a particular entry of an environmental information table that indicates market information for the business during the particular time period.

In a customer profile table, the machine learning system may add an entry corresponding to the particular entity and the particular time period. The newly added entry may include indexes to the above-identified entries, that is, the particular entry in the customer-specific information table, the particular entry in the product-specific information table, and the particular entry in the environmental information table. The new entry in the customer profile table represents a historical customer profile.

One or more embodiments include labeling the historical customer profiles with the historical sales insights to generate a training set (Operation 306). The machine learning system 200 labels the historical customer profiles with the historical sales insights to generate a training set. The machine learning system 200 identifies a particular entity and a particular time period associated with a particular historical customer profile. The machine learning system 200 identifies one or more historical sales insights associated with the particular entity and/or the particular time period.

The machine learning system 200 compiles the above-identified information as one dataset in the training set. A single historical sales insight may correspond to one or more historical customer profiles.

In an embodiment, the machine learning system 200 maintains a training set table. An entry of the training set table indicates (a) customer profile information and (b) one or more corresponding sales insights. Additional examples for generating a training set are described below with reference to FIGS. 4A-G.

One or more embodiments include applying a machine learning algorithm to the training set to generate an insight engine (Operation 308). The machine learning system applies a machine learning algorithm to the training set to generate an insight engine. Various machine learning algorithms may be used, examples of which are described below.

In an embodiment, a regression algorithm is used. The machine learning system 200 determines a regression function form. The regression function form includes a set of weights applicable to a set of attributes derived from a customer profile. Attributes derived from a customer profile may be manipulations of the customer-specific information. For example, each life cycle stage may be coded as a unique numerical value. Onboarding may be 1, planning may be 2, implementation may be 3. The encoded life cycle stages may be used as attributes in a regression function form.

As an example, a regression function form may be:

$$Y = \beta_0 + \beta_1 x_1 + \beta_2 x_2 + \ldots + \varepsilon$$

wherein Y is the output variable, which in this case, are the sales insights; $x_i$ are the attributes derived from a customer profile; $\varepsilon$ is an error variable; and $\beta_i$ are the weights applied to the attributes.

Alternative regression function forms may also be used. Various regression function forms may be associated with different types of regression, such as ordinary least squares regression, linear regression, non-linear regression, logistic regression, stepwise regression, polynomial regression, binomial regression, binary regression, non-parametric regression, multivariate adaptive regression spline, and locally estimated scatterplot smoothing regression.

Additionally, the machine learning system 200 determines an error measurement function. The error measurement function is configured to determine an error between (a) a set of predicted sales insights determined by applying the regression function form, having a particular set of values for the set of weights, to the set of historical customer profiles, and (b) the set of historical sales insights. An error may be represented as:

$$e = Y - \hat{Y}$$

wherein Y represents values of the output variable from a regression function based on the set of customer profiles; $\hat{Y}$ represents the values of the set of historical sales insights.

As an example, an error estimation function may be:

$$SSR = \sum_{i=1}^{n} e_i^2$$

Alternative error measurement functions may also be used. An example of an error measurement function is a sum of squared differences between (a) the set of predicted sales insights determined by applying a regression function to the set of historical customer profiles, and (b) the set of historical sales insights.

Thereafter, the machine learning system 200 determines a "best" set of values for the set of weights $\beta_i$, in the regression function form, such that the error, determined by the error measurement function, is minimized. The best values for the set of weights $\beta_i$ are applied to the regression function form to generate a regression function. The insight engine may utilize the regression function to determine predicted sales insights Y.

In an embodiment, a k-nearest neighbors (knn) algorithm is used. The machine learning system 200 generates the insight engine by storing (a) attributes derived from the historical customer profiles and (b) corresponding historical sales insights. The machine learning system 200 may store the data as a set of numerical values and/or a graph. The data forms a knn data model. The insight engine may utilize the knn data model to determine predicted sales insights.

In an embodiment, a decision tree learning algorithm is used. The machine learning system 200 determines a split quality function. The split quality function is configured to determine a quality of a split in a decision tree. A quality of a split may depend on the homogeneity of the output variable (which are the historical sales insights) within the subsets created by the split.

Thereafter the machine learning system 200 iteratively selects a respective attribute derived from the set of historical customer profiles as a respective variable for a respective split of the decision tree. The machine learning system 200 may work from the top down, from the root node to the leaf nodes. The machine learning system 200 selects each attribute for each split, such that a quality of the split as determined by the split quality function is maximized.

As an example, a set of attributes may be derived from a set of historical customer profiles. A machine learning system may select an attribute, from the set of attributes, as a variable for a first split of the decision tree, such that a quality of the first split as determined by the split quality function is maximized. Then the machine learning system may select another attribute, from the remaining set of attributes, as a variable for a second split of the decision tree, such that a quality of the second split as determined by the split quality function is maximized. Hence, the machine learning system may iterate the above procedure with respect to each split in the decision tree.

The machine learning system 200 thereby generates a decision tree. The insight engine may utilize the decision tree to determine predicted sales insights.

In an embodiment, the machine learning system 200 determines a separate decision tree for each of customer-specific information, product-specific information, and environmental information. Using customer-specific information, but not product-specific information and environmental information, the machine learning system 200 generates one or more decision trees. Using product-specific information, but not customer-specific information and environmental information, the machine learning system 200 generates one or more other decision trees. Using environmental information, but not customer-specific information and product-specific information, the machine learning system 200 generates one or more other decision trees. The multiple decision trees may form a single random forest model. The insight engine may utilize the random forest model to determine predicted sales insights.

In an embodiment, an ANN and/or deep learning algorithm is used. The machine learning system 200 generates one or more input layers, one or more hidden layers, and an output layer of the ANN. The insight engine may utilize the ANN to determine predicted sales insights.

Each hidden layer includes one or more neurons and/or processing nodes. A neuron is associated with (a) a weighted summation and (b) an activation function. The weighted summation is associated with a set of weights, respectively applicable to a set of inputs to the neuron. Where an input is a vector, the applicable weight is also a vector. A dot product is computed between each input vector and the applicable weight vector. The sum of the dot products (plus optionally a weighted bias value) may be referred to as a "state." The activation function takes the state as an input and normalizes the result (generally, a value between 0 and 1). The activation function may be, for example, a sigmoid function (such as a logistic function, or a hyperbolic tangent function), or any other function. Generally, the weights and activation function are learned using machine learning (such as backpropagation), however other methods for setting the weights and activation function may be used.

The machine learning system 200 determines types of hidden layers to be used. Types of hidden layers may include a fully connected layer, a convolutional layer, a max pooling layer, and/or other layers.

A fully connected layer includes a set of neurons that are fully connected with a previous input layer or hidden layer. Each neuron of the fully connected layer is connected to each neuron of the previous layer.

A convolutional layer includes a set of neurons, each of which is connected only with a subset of neurons from a previous input layer or hidden layer. In particular, each neuron is associated with a filter of a particular window size. A neuron of the convolutional layer is connected with neurons of a previous layer that are within the filter. The filters of a set of neurons of a convolutional layer span across the neurons of the previous layer. As an example, a previous layer may include five neurons: Neuron 1, Neuron 2, Neuron 3, Neuron 4, Neuron 5. A convolutional layer may include neurons associated with a filter of size three. Hence a first neuron of the convolutional layer may be connected to Neuron 1, Neuron 2, Neuron 3; a second neuron of the convolutional layer may be connected to Neuron 2, Neuron 3, Neuron 4; a third neuron of the convolutional layer may be connected to Neuron 3, Neuron 4, Neuron 5. The first, second, and third neurons of the convolutional layer thereby span across the neurons of the previous layer. The first, second, and third neurons together produce a vector. The vector includes three elements: one element determined based on Neuron 1, Neuron 2, Neuron 3; another element determined based on Neuron 2, Neuron 3, Neuron 4; another element determined based on Neuron 3, Neuron 4, Neuron 5.

A max pooling layer includes a set of neurons associated with weights that are not learned via machine learning but are determined based on the values of the inputs. In particular, the input with the maximum value has a weight of one, while all other inputs have a weight of zero.

Additional and/or alternative types of machine learning algorithms may also be used.

In an embodiment, the insight engine includes a single model to predict one or more sales insights. In another embodiment, the insight engine includes different models to predict different sales insights. The different models may use the same type of machine learning algorithm or different types of machine learning algorithms. In another embodiment, the insight engine includes different candidate models that accepts different types of input variables to predict different sales insights. The insight engine may select a subset of the candidate data models for predicting sales insights, depending on the available input variables derived from the customer profile. Additionally or alternatively, the insight engine may select a subset of the candidate data models for predicting sales insights, depending on the predicted sales insights requested.

One or more embodiments include identifying a target entity (Operation 310). A sales insight system 100 identifies a target entity, for which one or more predicted sales insights are requested. As an example, a user may request predicted sales insights for a target entity via a user interface. As another example, an application may request predicted sales insights for a target entity via an API.

One or more embodiments include generating a target customer profile based on current customer-specific information, current product-specific information, and/or current environmental information (Operation 312). The sales insight system 100 obtains current customer-specific information, current product-specific information, and/or current environmental information for the target entity.

In an embodiment, the machine learning system 200 gathers current customer-specific information, current product-specific information, and/or current environmental information, from various primary sources. Examples of methods for gathering information from primary sources are described above with reference to Operation 302.

In an embodiment, the machine learning system 200 retrieves current customer-specific information, current product-specific information, and/or current environmental information, from one or more databases. The current information was previously gathered from primary sources, and stored in standardized formats in the databases. The current customer-specific information, current product-specific information, and/or current environmental information may be stored as a customer profile for the target entity in a database.

In an embodiment, information for all input variables to the insight engine is obtained. Current customer-specific information, current product-specific information, and current environmental information, are all obtained for the target entity. In an alternative embodiment, only a subset of information for the input variables to the insight engine is obtained. For example, only one or two of current customer-specific information, current product-specific information, and current environmental information, are obtained for the target entity.

One or more embodiments include applying the insight engine to the target customer profile to determine one or more predicted sales insights (Operation 314). The sales insight system 100 applies the insight engine to the target customer profile to determine one or more predicted sales insights.

In an embodiment, the insight engine uses a regression function. The sales insight system 100 inputs the target customer profile into the regression function. The regression function outputs one or more predicted sales insights.

In an embodiment, the insight engine uses a knn data model. The knn data model includes a set of historical customer profiles, labeled with respective historical sales insights.

The sales insight system 100 determines a count k of a subset of the set of historical customer profiles to be selected for determining one or more predicted sales insights. The sales insight system 100 also determines a difference measurement function. The difference measurement function is configured to determine a difference between (a) the k selected historical customer profiles and (b) the target customer profile. An example of a difference measurement function is a function that determines a Euclidean distance between two points.

Thereafter the sales insight system 100 selects k of the set of historical customer profiles in the knn data model such that the difference, determined by the difference measure function, is minimized.

The sales insight system 100 determines the predicted sales insights based on the k selected historical customer profiles, without using the remaining historical customer profiles in the knn data model. The sales insight system 100 may determine a predicted sales insight for the target entity by determining an average (such as, mean, median, or mode) of the historical sales insights associated with the k selected historical customer profiles.

As an example, a sales insight system may select k historical customer profiles in a knn data model that are nearest to a target customer profile. One of the k historical customer profiles may indicate that a customer age is 19 years; another of the k historical customer profiles may indicate that a customer age is 17 years; another of the k historical customer profiles may indicate that a customer age is 18 years. The sales insight system may determine an average of the historical values for a customer age as a predicted customer age for the target entity. In the above example, the sales insight may predict that a customer age for the target entity is the average of 19, 17, and 18, which is 18 years.

In an embodiment, the insight engine uses a decision tree. The sales insight system 100 identifies a variable associated with a first split of the decision tree. The sales insight system 100 determines a value for the variable from the target customer profile. The sales insight system 100 inputs the value as the variable associated with the first split to determine which branch of the decision tree to follow. The sales insight system 100 then moves to a next split of the decision tree. The sales insight system 100 iterates the above process until a leaf of the decision tree is reached. The leaf determines one or more predicted sales insights for the target entity.

In an embodiment, the insight engine uses a random forest model. The decision trees in the random forest model may accept different types of input variables. One decision tree may accept customer-specific information, without accepting product-specific information and environmental information. Another decision tree may accept product-specific information, without accepting customer-specific information and environmental information. Another decision tree may accept environmental information, without accepting customer-specific information and product-specific information. The sales insight system 100 determines what types of information are available in the target customer profile. If a particular type of information is not available, then decision trees accepting the particular type of information are not used. The sales insight system 100 selects only the decision trees for which the associated type of information is available. Each selected decision tree independently determines one or more preliminary predicted sales insights for the target entity. The sales insight system 100 determines one or more predicted sales insights for the target entity by aggregating and/or compiling the preliminary predicted sales insights determined by each selected decision tree. For example, the sales insight system 100 may determine an average of the values for a particular predicted sales insight determined by one or more selected decision trees. The averaged value is used as the predicted sales insight for the target entity.

In an embodiment, the insight engine uses an ANN. The sales insight system 100 inputs the target customer profile into the ANN. The ANN outputs one or more predicted sales insights.

Additional and/or alternative functions and/or models may also be used in the insight engine.

One or more embodiments include executing one or more actions based on the predicted sales insights (Operation 316). The sales insight system 100 may execute various actions based on the predicted sales insights.

In an embodiment, the sales insight system 100 causes a sales and marketing application to present the predicted sales insights on a user interface. A salesperson may then take appropriate actions to maximize opportunities for maximizing revenue from the target entity. The salesperson may, for example, craft renewal negotiation strategies based on the predicted sales insights. If a renewal probability is low, the salesperson may increase incentives for renewal (such as decreasing price, increasing services offered, decreasing minimum contractual term). Conversely, if a renewal probability is high, the salesperson may attempt to maximum a profit margin.

In an embodiment, the sales insight system 100 compares a predicted sales insight with an action criteria. The action criteria may provide that a particular action is executed if, for example, the predicted sales insight is below a threshold value. As an example, if a predicted sales insight indicates that a probability of contract renewal is below a threshold value of 50%, then a sales and marketing application may cause a promotion to be transmitted to the target entity.

Optionally, one or more embodiments include updating the target customer profile with current information (Operation 318). The sales insight system 100 periodically monitors primary sources and/or databases for additional customer-specific information, product-specific information, and/or environmental information that is associated with the target entity. If additional information is found, the sales insight system 100 updates the target customer profile with the current information.

Thereafter the sales insight system 100 iterates Operation 314. The sales insight system 100 re-applies the insight engine to the updated target customer profile to determine updated predicted sales insights.

Optionally, one or more embodiments include monitoring the target entity to obtain one or more actual sales insights (Operation 320). The sales insight system 100 periodically monitors primary sources and/or databases for actual sales insights associated with the target entity. In an embodiment, the sales insight system 100 obtains actual sales insights directly from one or more primary sources. In another embodiment, the sales insight system 100 obtains current information from one or more primary sources, and determines actual sales insights based on the current information.

In an embodiment, if no action was executed based on the predicted sales insights at Operation 316, then the sales insight system 100 compares the predicted sales insights and the actual sales insights to determine an accuracy of the insight engine. A difference between the predicted sales insights and the actual sales insights may be used to rate the insight engine. For example, if a difference between the predicted sales insights and the actual sales insights is below a threshold value, the insight engine may be rated with a high level of accuracy. If a difference between the predicted sales insights and the actual sales insights is above a threshold value, the insight engine may be rated with a low level of accuracy.

In an embodiment, if an action was executed based on the predicted sales insights at Operation 316, then the sales insight system 100 compares the predicted sales insights and the actual sales insights to determine an effectiveness of the action. If the actual sales insights results in more revenue for the business than the predicted sales insights, then the action may be determined as effective. Based on the amount of increased revenue, the action may be rated with a level of effectiveness.

Optionally, one or more embodiments include incorporating the target customer profile and the actual sales insights into the training set (Operation 322). The machine learning system 200 incorporates the target customer profile and the actual sales insight into the training set.

Thereafter the machine learning system 200 reiterates Operation 308. The machine learning system 200 re-applies the machine learning algorithm to the updated training set to generate an updated insight engine. The updated training set may but does not necessarily include updated target customer profiles from Operation 318.

4. EXAMPLE EMBODIMENTS

Detailed examples are described below for purposes of clarity. Components and/or operations described below should be understood as specific examples which may not be applicable to certain embodiments. Accordingly, components and/or operations described below should not be construed as limiting the scope of any of the claims.

FIGS. 4A-G illustrate examples for generating a training set for training and generating an insight engine, in accordance with one or more embodiments.

A machine learning system obtains historical customer-specific information, historical product-specific information, and historical environmental information from various data sources. The machine learning system converts the historical information into a standardized format and stores the standardized historical information into various tables. As illustrated, different tables store different types of historical information.

Customer-specific information table 402 stores customer-specific information. Each entry indicates information specific to a particular entity and a particular time period. Such information may include contract term, subscribed products, and product usage for each subscribed product.

Product-specific information table 404 stores product-specific information. Each entry indicates information specific to a particular product and a particular time period. Such information may include product functionality, system performance, and pricing.

Business market information table 406 stores business market information. Each entry indicates business market information specific to a particular time period. Customer market information table 408 stores customer market information. Each entry indicates market information specific to a particular entity and a particular time period. Product market information table 410 stores product market information. Each entry indicates market information specific to a particular product and a particular time period.

The machine learning system generates historical customer profiles based on the historical information. As illustrated, customer profile table 412 stores historical customer profiles. Each entry includes an index into customer-specific information table 402, product-specific information table 404, business market information table 406, customer market information table 408, and/or product market information table 410.

An entry in customer profile table 412 indexes entries from the above tables based on customer, product, and/or time period.

For example, entry 0 of customer profile table 412 indexes to entry 0 of customer-specific information table 402. Entry 0 of customer-specific information table 402 is associated with entity Hannah Bags and time period December 2010. Entry 0 indicates that Basic DB is a subscribed product. Thus, Hannah Bags, Basic DB, and December 2010 are used for identifying associated entries in the remaining tables. (In this example, a unit of the time period referenced is a month, but other units of time periods may alternatively be used.)

Product-specific information table 404 is searched for any entries associated with product Basic DB and time period December 2010. Entry 0 of product-specific information table 404 is identified as a match. Hence, entry 0 of customer profile table 412 further indexes to entry 0 of product-specific information table 404.

Business market information table 406 is searched for any entries associated with time period December 2010. Entry 0 of business market information table 406 is identified as a match. Hence, entry 0 of customer profile table 412 further indexes to entry 0 of business market information table 406.

Customer market information table 408 is searched for any entries associated with entity Hannah Bags and time period December 2010. Entry 0 of customer market information table 408 is identified as a match. Hence, entry 0 of customer profile table 412 further indexes to entry 0 of customer market information table 408.

Product market information table 410 is searched for any entries associated with product Basic DB and time period December 2010. Entry 0 of product market information table 410 is identified as a match. Hence, entry 0 of customer profile table 412 further indexes to entry 0 of product market information table 410.

Similarly, remaining entries of customer profile table 412 are populated. Some entries of customer profile table 412 may include indexes into all the tables 402-410. Other entries of customer profile table 412 might not include indexes into all the tables 402-410. Each entry of customer profile table 412 represents a historical customer profile.

The machine learning system obtains an action log 414 from an application (such as a CRM application). Action log 414 indicates various actions in relation to entities that are potential, current, and/or future customers of the business. The machine learning system determines historical sales insights directly based on action log 414.

Historical customer profiles are labeled with historical sales insights, based on customer, product, and/or time period. The labeled historical customer profiles form one or more training sets.

Renewal training set 416 labels historical customer profiles with historical renewal information.

For example, entry 0 of renewal training set 416 indexes to entry 0 of customer profile table 412. Entry 0 of customer profile table 412 is associated with entity Hannah Bags and time period December 2010. Thus, Hannah Bags, and December 2010 are used for identifying associated historical sales insights.

Action log 414 is searched for renewal information associated with Hannah Bags, and December 2010. Entry 0 of action log 414 is identified as a match. Entry 0 of action log 414 indicates that renewal did occur. Hence, entry 0 of renewal training set 416 includes a field indicating that renewal did occur.

Cross-sell training set 418 labels historical customer profiles with historical cross-sell information.

For example, entry 2 of cross-sell training set 418 indexes to entry 2 of customer profile table 412. Entry 2 of customer profile table 412 is associated with entity Smith Shoes and time period October 2014. Thus, Smith Shoes, and October 2014 are used for identifying associated historical sales insights.

Action log 414 is searched for cross-sell information associated with Smith Shoes, and October 2014. Entry 5 of action log 414 is identified as a match. Entry 5 of action log 414 indicates that subscription to Deluxe DB occurred. Hence, entry 2 of cross-sell training set 418 further includes a field indicating that the subscribed products include Deluxe DB.

As described above, the machine learning system obtains action log 414 from an application (such as a CRM application). The machine learning system determines historical sales insights indirectly based on action log 414.

The machine learning system generates a life cycle stage information table 420 to store life cycle stage information determined based on action log 414. Life cycle stage information table 420 includes fields for "Starting Stage," "End Stage," and "Time Between." The "Time Between" field indicates the duration of time between the life cycle stage indicated in the "Starting Stage" field and the life cycle stage indicated in the "End Stage" field.

For example, entry 0 of life cycle stage information table 420 is associated with Smith Shoes and May 2014. May 2014 is associated with a life stage transition for Smith Shoes from onboarding to planning. Action log 414 indicates onboarding began on May 31, 2014, and planning began on Jul. 3, 2014. The duration of time between May 31, 2014 and Jul. 3, 2014 is 33 days. Therefore, entry 0 of life cycle stage information table 420 indicates that the time between onboarding and planning is 33 days.

The machine learning system generates a customer age information table 422 to store customer age information determined based on action log 414. Customer age information table 422 includes fields for "Date Entered Relationship," "Date Ended Relationship," and "Age." If the "Date Ended Relationship" field is populated, the "Age" field indicates the duration of time between the date indicated in "Date Entered Relationship" field and the date indicated in "Date Ended Relationship" field. If the "Date Ended Relationship" field is not populated, the "Age" field indicates the duration of time between the date indicated in "Date Entered Relationship" field and the current date (which may be for example Oct. 1, 2019).

For example, entry 1 of customer age information table 422 is associated with Smith Shoes. Based on action log 414, Smith Shoes started the relationship with the business on Sep. 13, 2014. Further based on action log 414, Smith Shoes has not terminated the relationship. Therefore, a duration of time between Sep. 13, 2014 and the current date of Oct. 1, 2019 is calculated. The duration of time between Sep. 13, 2014 and Oct. 1, 2019 is 1844. Therefore, entry 1 of customer age information table 422 indicates that the customer age is 1844.

Thereafter, historical customer profiles are labeled with historical sales insights, based on customer, product, and/or time period, as described above.

Life cycle training set 424 labels historical customer profiles with historical life cycle information.

For example, entry 0 of life cycle training set 424 indexes to entry 2 of customer profile table 412. Entry 2 of customer profile table 412 is associated with entity Smith Shoes.

Life cycle stage information table 420 is searched for life cycle stage information associated with Smith Shoes. Entries 0-3 of life cycle stage information 420 are identified as matches. Entry 0 of life cycle stage information 420 indicates 33 days between onboarding and planning; entry 1 of life cycle stage information 420 indicates 56 days between planning and implementation; entry 2 of life cycle stage information 420 indicates 16 days between implementation and provisioning; entry 3 of life cycle stage information 420 indicates 18 days between provisioning and live.

Hence, three additional entries, entries 1-3, that are associated with Smith Shoes are added to life cycle training set 424. Information from entries 0-3 of life cycle stage information 420 are copied over. Hence, entry 0 of life cycle training set 424 indexes into entry 2 of customer profile table 412 and indicates 33 days between onboarding and planning; entry 1 of life cycle training set 424 indexes into entry 2 of customer profile table 412 and indicates 56 days between planning and implementation; entry 2 of life cycle training set 424 indexes into entry 2 of customer profile table 412 and indicates 16 days between implementation and provisioning; entry 3 of life cycle training set 424 indexes into entry 2 of customer profile table 412 and indicates 18 days between provisioning and live.

Customer age training set 426 labels historical customer profiles with historical customer age information. Customer profile table 412 is searched for all entries associated with the same entity. The entries of customer profile table 412 associated with the same entity are aggregated as a single entry of customer age training set 426.

For example, entry 0 and entry 1 of customer profile table 412 are associated with Hannah Bags. The remaining entries of customer profile table 412 are not associated with Hannah Bags. Hence entry 0 of customer age training set 426 indexes to entry 0 and entry 1 of customer profile table 412.

Customer age information table 422 is searched to determine customer age information for Hannah Bags. Based on customer age information table 422, Hannah Bags terminated on 12/15/2013. Further, based on customer age information table 422, the customer age of Hannah Bags is 2206. Hence entry 0 of customer age training set 426 indexes to entry 0 and entry 1 of customer profile table 412, indicates that the relationship is terminated, and indicates that the customer age is 2206.

As illustrated, the machine learning system generates a separate training set 416, 418, 424, 426 for each sales insight. Each separate training set 416, 418, 424, 426 may be used to train a separate function and/or model for predicting a different sales insight. Alternatively the separate training sets 416, 418, 424, 426 may be used to train a single function and/or model for predicting one or more sales insights.

In other examples, a single training set may be generated for multiple sales insights. For example, the training sets 416, 418, 424, 426 may be included in a single table.

Optionally, training sets 416, 418, 424, 426 may be updated with additional customer profiles and/or sales insights. New entries may be added to the training sets 416, 418, 424, 426 to incorporate the additional information.

After training sets 416, 418, 424, 426 are generated, the machine learning system applies a machine learning algorithm to training sets 416, 418, 424, 426. The machine learning algorithm thereby generates and/or updates an insight engine.

Figure 5:
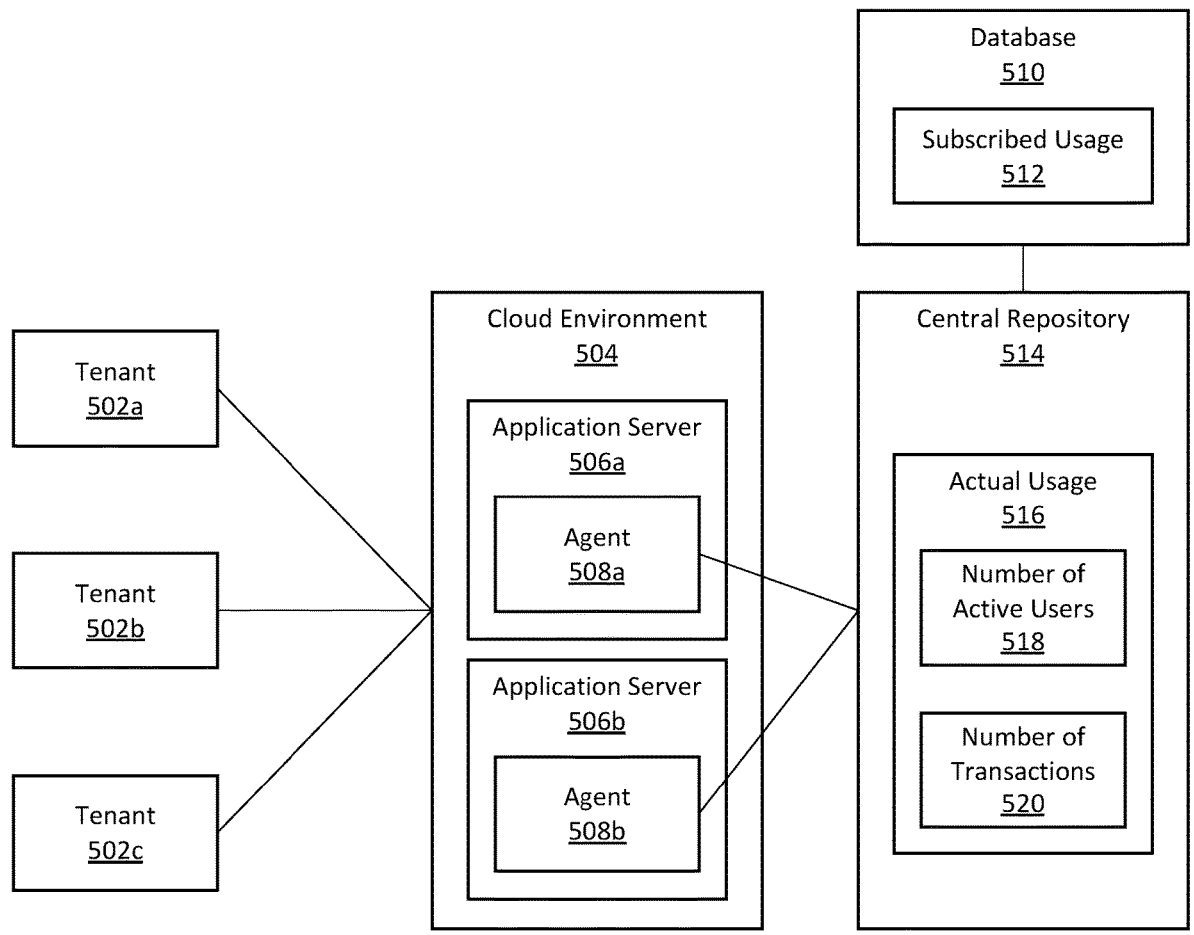
FIG. 5 illustrates an example for determining product usage information, in accordance with one or more embodiments.

FIG. 5 illustrates an example for determining product usage information, according to one or more embodiments.

A cloud environment 504 hosts application servers 506a-b. Each application server 506a-b executes an instance of a cloud application. Multiple tenants 502a-b share the resources of the cloud environment 504, including the cloud application. Each tenant 502a-b is contracted to have access to a particular level of subscribed usage 512 of the cloud application. Information regarding the subscribed usage 512 levels are stored in a customer database 510.

Agents 508a-b are installed on application servers 506a-b to collect metric information. Metric information includes user logins, transactions performed, and compute performance units. The metric information is labeled with customer identifiers identifying a respective tenant 502a-c associated with each metric. Agents 508a-b transmits the metric information to a central repository 514.

The central repository 514 consolidates the metric information from the multiple agents 508a-b based on customer identifiers. Hence, one set of consolidated metric information corresponds to tenant 502a; another set of consolidated metric information corresponds to tenant 502b; and another set of consolidated metric information corresponds to tenant 502c.

The central repository 514 performs analytics on the metric information to obtain actual usage 516 information. The actual usage 516 information may include a number of active users 518 per month and/or a number of transactions 520 per month.

A number of active users 518 per month may be defined as a number of users who logged into the cloud application per month. The central repository 514 analyzes the user logins. The central repository determines a number of unique user logins per month, which is used as the number of active users 518 per month.

Alternatively, a number of active users 518 per month may be defined as a number of users who performed certain critical transactions using the cloud application per month. The central repository 514 analyzes the transactions. The central repository identifies a set of users corresponding to each critical transaction. The central repository determines a number of unique users in the set of users, which is used as the number of active users 518 per month.

A number of transactions 520 per month may be defined as a number of transactions that meet certain criteria per month. For example, only transactions over a certain data level threshold may be counted. Or, only transactions of certain types may be counted. The central repository 514 analyzes the transactions. The central repository identifies a set of transactions meeting the criteria as the number of transactions 520 per month.

The actual usage 516 stored in the central repository 514 and the subscribed usage 512 stored in the database 510 are compared. A percentage at which the actual usage 516 is above or below the subscribed usage 512, for each tenant 506a-c, is determined.

The actual usage 516 information, and the percentage of actual usage 516 over subscribed usage 512, are compiled into a respective customer profile for each tenant 506a-c. The customer profiles are input into an insight engine to determine predicted sales insights.

As an example, a customer profile for tenant 506a may indicate that actual usage 516 is substantially over subscribed usage 512. The customer profile may be input into an insight engine to determine a renewal probability for tenant 506a. Based at least on the usage information, the insight engine may determine that a renewal probability is high. Conversely, a customer profile for tenant 506b may indicate that actual usage 516 is substantially less than subscribed usage 512. The customer profile may be input into the insight engine to determine a renewal probability for tenant 506b. Based at least on the usage information, the insight engine may determine that a renewal probability is low.

5. COMPUTER NETWORKS AND CLOUD NETWORKS

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

6. HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

7. MISCELLANEOUS; EXTENSIONS

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory machine-readable media storing instructions which, when executed by one or more processors, cause:
    obtaining historical customer-specific information from a first set of data sources;
    obtaining historical product-specific information from a second set of data sources;
    obtaining historical environmental information from a third set of data sources;
    generating a set of historical customer profiles associated with a set of entities, each historical customer profile comprising a respective subset of the product-specific information, a respective subset of the customer-specific information, and a respective subset of the environmental information;
    obtaining historical sales insights associated with the set of entities, wherein the historical sales insights comprises one or more of:
    (a) whether each of the set of entities renewed a respective contract;
    (b) a set of products that each of the set of entities purchased;
    (c) time between life cycle stages for each of the set of entities;
    (d) a duration that each of the set of entities remained a customer;
    generating a training set comprising the historical customer profiles and the historical sales insights;
    applying a machine learning algorithm to the training set to generate an insight engine;
    identifying a target entity for which a predicted sales insight for a particular time period is requested;
    generating a target customer profile associated with the target entity, the target customer profile comprising one or more of:
    (a) customer-specific information, associated with the target entity, obtained from at least one of the first set of data sources;
    (b) product-specific information, associated with one or more products purchased by the target entity, obtained from at least one of the second set of data sources;
    (c) environmental information, associated with the particular time period, obtained from at least one of the third set of data sources;
    applying the insight engine to the target customer profile to determine the predicted sales insight for the particular time period, wherein applying the insight engine to the target customer profile to determine the predicted sales insight for the particular time period comprises:
    determining a number of historical customer profiles to be used for determining the predicted sales insight;
    selecting a subset of the set of historical customer profiles, the subset comprising the determined number of historical customer profiles, at least by: executing a difference measurement function to determine, for each historical customer profile in the set of historical customer profiles, a difference value between (a) the target customer profile and (b) the historical customer profile;
    selecting the subset of the set of historical customer profiles, the subset comprising the determined number of historical customer profiles, such that a total of difference values between (a) the target customer profile and (b) the subset of the set of historical customer profiles is minimized;
    determining the predicted sales insight based on the subset of the set of historical customer profiles;
    determining an actual sales insight for the particular time period for the target entity;
    incorporating the target customer profile and the actual sales insight into the training set;
    re-applying the machine learning algorithm to the training set to update the insight engine.

2. The medium of claim 1, wherein applying the machine learning algorithm to the training set to generate the insight engine comprises:
    determining a regression function form, wherein the regression function form includes a set of weights applicable to a set of attributes derived from a customer profile;
    determining an error measurement function, wherein the error measurement function is configured to determine an error between (a) a set of predicted sales insights determined by applying the regression function form having a set of values for the set of weights to the set of historical customer profiles, and (b) the set of historical sales insights;
    determining a particular set of values for the set of weights, in the regression function form, such that the error, determined by the error measurement function, is minimized;
    generating the insight engine, wherein the insight engine comprises a regression function that uses the particular set of values for the set of weights in the regression function form.

3. The medium of claim 2, wherein the regression function form is associated with one of ordinary least squares regression, linear regression, non-linear regression, logistic regression, stepwise regression, polynomial regression, binomial regression, binary regression, non-parametric regression, multivariate adaptive regression spline, and locally estimated scatterplot smoothing regression.

4. The medium of claim 2, wherein the error measurement function is configured to determine a sum of squared differences between (a) the set of predicted sales insights determined by applying the regression function form having the set of values for the set of weights to the set of historical customer profiles, and (b) the set of historical sales insights.

5. The medium of claim 1, wherein applying the machine learning algorithm to the training set to generate the insight engine comprises: determining a split quality function, wherein the split quality function is configured to determine a quality of a split in a decision tree; iteratively selecting a respective attribute derived from the set of historical customer profiles as a respective variable for a respective split of the decision tree, such that a respective quality of each split is maximized; generating the insight engine, wherein the insight engine comprises the decision tree.

6. The medium of claim 5, wherein: the insight engine comprises: the decision tree, which accepts as input attributes derived from the historical customer- specific information but does not accept as input attributes derived from the historical product specific information or the historical environmental information; a second decision tree, which accepts as input attributes derived from the historical product-specific information but does not accept as input attributes derived from the historical customer-specific information or the historical environmental information;
a third decision tree, which accepts as input attributes derived from the historical environmental information but does not accept as input attributes derived from the historical customer-specific information or the historical product-specific information;
applying the insight engine to the target customer profile to determine the predicted sales insight for the particular time period comprises: determining whether to utilize the decision tree based on whether the target customer profile includes the customer-specific information; determining whether to utilize the second decision tree based on whether the target customer profile includes the product-specific information; determining whether to utilize the third decision tree based on whether the target customer profile includes the environmental information; determining the sales insight based on the utilized decision trees and not based on the non-utilized decision trees.

7. The medium of claim 1, wherein generating the set of historical customer profiles associated with the set of entities comprises:
identifying a first entry of a customer-specific information table that is associated with a particular entity, wherein the first entry indicates a particular product to which the particular entity is subscribed during a particular time period;
identifying a second entry of a product-specific information table that is associated with the particular product, wherein the second entry indicates information related to at least one of a product functionality, system performance, and pricing associated with the particular product during the particular time period; identifying a third entry of an environmental information table, wherein the third entry indicates information related to at least one of a market performance of a business selling a product or service to the target entity, a market performance of the target entity, and a market share of the particular product during the particular time period;
generating a customer profile entry that indexes to the first entry of the customer-specific information table, the second entry of the product-specific information table, and the third entry of the environmental information table.

8. The medium of claim 1, further storing instructions which cause: prior to incorporating the target customer profile and the actual sales insight into the training set:
updating the target customer profile with new information, such that the target customer profile comprises two or more of:(a) the customer-specific information, associated with the target entity, obtained from the at least one of the first set of data sources; (b) the product-specific information, associated with the one or more products purchased by the target entity, obtained from the at least one of the second set of data sources; (c) the environmental information, associated with the particular time period, obtained from the at least one of the third set of data sources.

9. The medium of claim 1, further storing instructions which cause: updating the target customer profile with new information, such that the target customer profile comprises two or more of:(a) the customer-specific information, associated with the target entity, obtained from the at least one of the first set of data sources; (b) the product-specific information, associated with the one or more products purchased by the target entity, obtained from the at least one of the second set of data sources; (c) the environmental information, associated with the particular time period, obtained from the at least one of the third set of data sources; re-applying the insight engine to the target customer profile to update the predicted sales insight for the particular time period.

10. The medium of claim 1, wherein the target customer profile comprises the customer-specific information, and the customer-specific information comprises one or more of: a current contract term associated with the target entity; a current life cycle stage associated with the target entity; a current set of subscribed products associated with the target entity; product usage of at least one of the current set of subscribed products associated with the target entity; outstanding bugs of the at least one of the current set of subscribed products raised by the target entity; a current customer age of the target entity.

11. The medium of claim 1, wherein the target customer profile comprises the product-specific information, and the product-specific information comprises one or more of: a first score representing a relative product functionality of a subscribed product associated with the target entity; a second score representing a relative system performance of the subscribed product associated with the target entity.

12. The medium of claim 11, wherein the relative system performance of the subscribed product is determined by comparing performance levels achieved while executing a benchmark test on the subscribed product and one or more similar products.

13. The medium of claim 1, wherein the target customer profile comprises the environmental information, and the environmental information comprises one or more of:
a first score representing a relative market performance of a business selling a product or service to the target entity; a second score representing a relative market performance of the target entity; a third score representing a relative market share of a subscribed product associated with the target entity.

14. The medium of claim 1, wherein: the historical customer-specific information comprises one or more of: a contract term associated with an entity; a life cycle stage associated with the entity; a set of subscribed products associated with the entity; product usage of a subscribed product, of the set of subscribed products, associated with the entity; outstanding bugs of the subscribed product raised by the entity; a customer age of the entity; the historical product-specific information comprises one or more of: a first score representing a relative product functionality of the subscribed product associated with the entity; a second score representing a relative system performance of the subscribed product associated with the entity; a third score representing a relative pricing of the subscribed product associated with the entity; the historical environmental information comprises one or more of: a fourth score representing a relative market performance of a business selling a product or service to the entity; a fifth score representing a relative market performance of the entity; a sixth score representing a relative market share of the subscribed product associated with the entity.

15. The medium of claim 1, wherein the predicted sales insight comprises one or more of: a renewal probability; a set of one or more predicted cross-sell products; a predicted duration between life cycle stages; a predicted customer age.

16. The medium of claim 1, further storing instructions which cause: updating the target customer profile with new information, such that the target customer profile comprises two or more of:(a) the customer-specific information, associated with the target entity, obtained from the at least one of the first set of data sources; (b) the product-specific information, associated with the one or more products purchased by the target entity, obtained from the at least one of the second set of data sources; (c) the environmental information, associated with the particular time period, obtained from the at least one of the third set of data sources; subsequent to updating the target customer profile: re-applying the insight engine to the target customer profile to update the predicted sales insight for the particular time period; determining an actual sales insight for the particular time period for the target entity; subsequent to updating the target customer profile and determining the actual sales insight: incorporating the target customer profile and the actual sales insight into the training set; re-applying the machine learning algorithm to the training set to update the insight engine; wherein: generating the set of historical customer profiles associated with the set of entities comprises:
   identifying a first entry of a customer-specific information table that is associated with a particular entity, wherein the first entry indicates a particular product to which the particular entity is subscribed during a particular time period; identifying a second entry of a product-specific information table that is associated with the particular product, wherein the second entry indicates information related to at least one of a product functionality, system performance, and pricing associated with the particular product during the particular time period; identifying a third entry of an environmental information table, wherein the third entry indicates information related to at least one of a market performance of a business selling a product or service to the target entity, a market performance of the target entity, and a market share of the particular product during the particular time period; generating a customer profile entry that indexes to the first entry of the customer-specific information table, the second entry of the product specific information table, and the third entry of the environmental information table;

applying the machine learning algorithm to the training set to generate the insight engine comprises: determining a regression function form, wherein the regression function form includes a set of weights applicable to a set of attributes derived from a customer profile;
determining an error measurement function, wherein the error measurement function is configured to determine an error between (a) a set of predicted sales insights determined by applying the regression function form having a set of values for the set of weights to the set of historical customer profiles, and (h) the set of historical sales insights;
determining a particular set of values for the set of weights, in the regression function form, such that the error, determined by the error measurement function, is minimized;
generating the insight engine, wherein the insight engine comprises a regression function that uses the particular set of values for the set of weights in the regression function form; the regression function form is associated with one of ordinary least squares regression, linear regression, non-linear regression, logistic regression, stepwise regression, polynomial regression, binomial regression, binary regression, non-parametric regression, multivariate adaptive regression spline, and locally estimated scatterplot smoothing regression; the error measurement function is configured to determine a sum of squared differences between (a) the set of predicted sales insights determined by applying the regression function form having the set of values for the set of weights to the set of historical customer profiles, and (b) the set of historical sales insights; the target customer profile comprises the customer-specific information, the product-specific information, and the environmental information; the customer-specific information comprises one or more of: a current contract term associated with the target entity; a current life cycle stage associated with the target entity; a current set of subscribed products associated with the target entity; product usage of at least one of the current set of subscribed products associated with the target entity; outstanding bugs of the at least one of the current set of subscribed products raised by the target entity; a current customer age of the target entity; the product-specific information comprises one or more of: a first score representing a relative product functionality of a subscribed product associated with the target entity; a second score representing a relative system performance of the subscribed product associated with the target entity; a third score representing a relative pricing of the subscribed product associated with the target entity;
the environmental information comprises one or more of: a first score representing a relative market performance of a business selling a product or service to the target entity;
a second score representing a relative market performance of the target entity; a third score representing a relative market share of a subscribed product associated with the target entity; the predicted sales insight comprises one or more of: a renewal probability;
a set of one or more predicted cross-sell products; a predicted duration between life cycle stages; a predicted customer age.

17. The medium of claim 1, wherein determining the predicted sales insight is not based on any historical customer+profiles, of the set of historical customer profiles, not included in the selected subset of the set of historical customer profiles.

18. A system, comprising: one or more devices including one or more hardware processors; and the system being configured to perform operations comprising:
obtaining historical customer-specific information from a first set of data sources;
obtaining historical product-specific information from a second set of data sources;
obtaining historical environmental information from a third set of data sources;
generating a set of historical customer profiles associated with a set of entities, each historical customer profile comprising a respective subset of the product-specific information, a respective subset of the customer-specific information, and a respective subset of the environmental information; obtaining historical sales insights associated with the set of entities, wherein the historical sales insights comprises one or more of:
(a) whether each of the set of entities renewed a respective contract;
(b) a set of products that each of the set of entities purchased;
(c) time between life cycle stages for each of the set of entities;
(d) a duration that each of the set of entities remained a customer;
generating a training set comprising the historical customer profiles and the historical sales insights;
applying a machine learning algorithm to the training set to generate an insight engine;
identifying a target entity for which a predicted sales insight for a particular time period is requested;
generating a target customer profile associated with the target entity, the target customer profile comprising one or more of:
(a) customer-specific information, associated with the target entity, obtained from at least one of the first set of data sources; (b) product-specific information, associated with one or more products purchased by the target entity, obtained from at least one of the second set of data sources; (c) environmental information, associated with the particular time period, obtained from at least one of the third set of data sources;
applying the insight engine to the target customer profile to determine the predicted sale s insight for the particular time period, wherein applying the insight engine to the target customer profile to determine the predicted sales insight for the particular time period comprises:
determining a number of historical customer profiles to be used for determining the predicted sales insight;
selecting a subset of the set of historical customer profiles, the subset comprising the determined number of historical customer profiles, at least by:
executing a difference measurement function to determine, for each historical customer profile in the set of historical customer profiles, a difference value between (a) the target customer profile and (b) the historical customer profile;
selecting the subset of the set of historical customer profiles, the subset comprising the determined number of historical customer profiles, such that a total of difference values between (a) the target customer profile and (b) the subset of the set of historical customer profiles is minimized;
determining the predicted sales insight based on the subset of the set of historical customer profiles;
determining an actual sales insight for the particular time period for the target entity;
incorporating the target customer profile and the actual sales insight into the training set;
re-applying the machine learning algorithm to the training set to update the insight engine.

19. A method comprising: obtaining historical customer-specific information from a first set of data sources;
obtaining historical product-specific information from a second set of data sources;
obtaining historical environmental information from a third set of data sources;
generating a set of historical customer profiles associated with a set of entities, each historical customer profile comprising a respective subset of the product-specific information, a respective subset of the customer-specific information, and a respective subset of the environmental information; obtaining historical sales insights associated with the set of entities, wherein the historical sales insights comprises one or more of:
(a) whether each of the set of entities renewed a respective contract;
(b) a set of products that each of the set of entities purchased;
(c) time between life cycle stages for each of the set of entities;
(d) a duration that each of the set of entities remained a customer; generating a training set comprising the historical customer profiles and the historical sales insights;
applying a machine learning algorithm to the training set to generate an insight engine;
identifying a target entity for which a predicted sales insight for a particular time period is requested;
generating a target customer profile associated with the target entity, the target customer profile comprising one or more of:
(a) customer-specific information, associated with the target entity, obtained from at least one of the first set of data sources;
(b) product specific information, associated with one or more products purchased by the target entity, obtained from at least one of the second set of data sources;
(c) environmental information, associated with the particular time period, obtained from at least one of the third set of data sources;
applying the insight engine to the target customer profile to determine the predicted sales insight for the particular time period, wherein applying the insight engine to the target customer profile to determine the predicted sales insight for the particular time period comprises:
determining a number of historical customer profiles to be used for determining the predicted sales insight;
selecting a subset of the set of historical customer profiles, the subset comprising the determined number of historical customer profiles, at least by:
executing a difference measurement function to determine, for each historical customer profile in the set of historical customer profiles, a difference value between (a) the target customer profile and (b) the historical customer profile;
selecting the subset of the set of historical customer profiles, the subset comprising the determined number of historical customer profiles, such that a total of difference values between (a) the target customer profile and (b) the subset of the set of historical customer profiles is minimized;
determining the predicted sales insight based on the subset of the set of historical customer profiles;
determining an actual sales insight for the particular time period for the target entity;
incorporating the target customer profile and the actual sales insight into the training set;
re-applying the machine learning algorithm to the training set to update the insight engine, wherein the method is performed by one or more devices including one or more hardware processors.

* * * * *

UNITED STATES PATENT AND TRADEMARK OFFICE
CERTIFICATE OF CORRECTION

PATENT NO. : 11,625,736 B2
APPLICATION NO. : 16/700813
DATED : April 11, 2023
INVENTOR(S) : Mehmanpazir et al.

It is certified that error appears in the above-identified patent and that said Letters Patent is hereby corrected as shown below:

On the Title Page

On page 2, Column 1, under Other Publications, Line 13, delete "Arlincial" and insert -- Artificial --, therefor.

In the Claims

In Column 34, Line 11, in Claim 16, delete "(h)" and insert -- (b) --, therefor.

In Column 35, Line 48, in Claim 18, delete "sale s" and insert -- sales --, therefor.

Signed and Sealed this
Thirteenth Day of February, 2024

Katherine Kelly Vidal
*Director of the United States Patent and Trademark Office*